United States Patent [19]
Yamagata

[11] Patent Number: 6,003,052
[45] Date of Patent: Dec. 14, 1999

[54] PORTABLE INFORMATION INSTRUMENT HAVING A DISPLAY COVER PROTECTING A DISPLAY SCREEN

[75] Inventor: Hideto Yamagata, Tokyo, Japan

[73] Assignee: NEC Corporation, Tokyo, Japan

[21] Appl. No.: 08/984,948

[22] Filed: Dec. 4, 1997

[30] Foreign Application Priority Data

Dec. 4, 1996 [JP] Japan ..................................... 8-323240

[51] Int. Cl.⁶ ...................................................... G06F 1/16
[52] U.S. Cl. ........................... 708/100; 361/681; 345/905
[58] Field of Search ............................ 708/100; 361/679, 361/681, 683; 345/905

[56] References Cited

U.S. PATENT DOCUMENTS

| | | | |
|---|---|---|---|
| 4,589,659 | 5/1986 | Yokoi et al. | 364/708.1 |
| 4,703,161 | 10/1987 | McLean | 364/708.1 |
| 4,847,798 | 7/1989 | Kurashima | 364/708.1 |
| 5,002,184 | 3/1991 | Lloyd | 364/708.1 |
| 5,200,913 | 4/1993 | Hawkins et al. | 364/708.1 |
| 5,383,138 | 1/1995 | Motoyama | 364/708.1 |
| 5,555,157 | 9/1996 | Moller et al. | 361/679 |
| 5,682,182 | 10/1997 | Tsubosaka | 345/905 |

*Primary Examiner*—David H. Malzahn
*Attorney, Agent, or Firm*—Foley & Lardner

[57] ABSTRACT

In a portable information instrument including a housing having an window, and a display screen accommodated within the housing but exposed in the window to display data processed in the portable information instrument, a cover sheet for protecting the display screen is formed of a soft back sheet and a plurality of rectangular hard pieces fixed on the back sheet. An accommodating mechanism is provided within an inside of the housing, and is spring-biased to retract the cover sheet into the inside of the housing. A stopper mechanism is also provided within the inside of the housing, for inhibiting accommodation of the cover sheet into the inside of the housing by the accommodating mechanism. A sensor is provided within the inside of the housing, for detecting passage of the rectangular hard pieces before the sensor, and an information processor located within the inside of the housing, counts a detection signal generated by the sensor, for activating the stopper mechanism when a count value reaches a predetermined value.

15 Claims, 8 Drawing Sheets

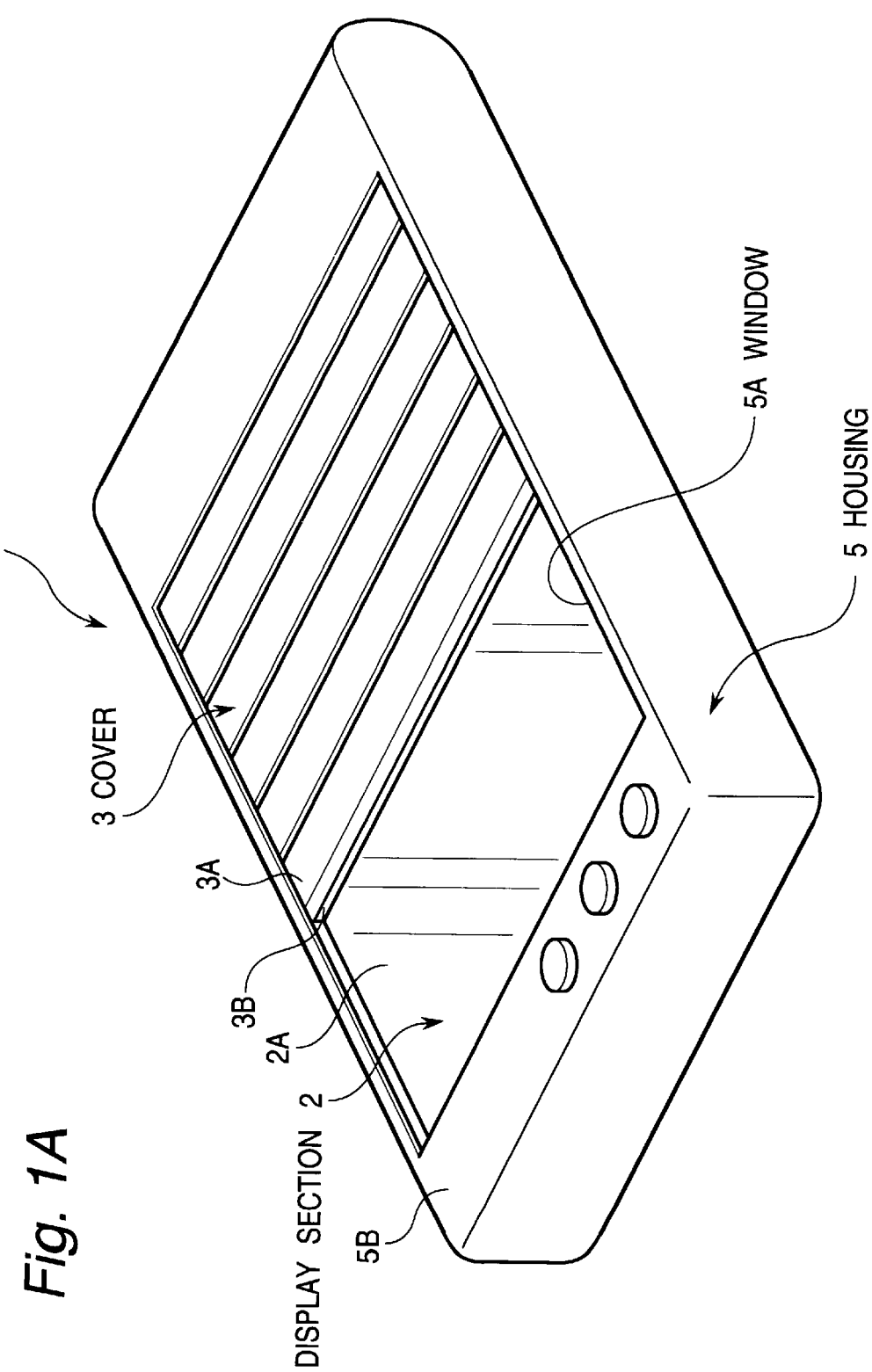

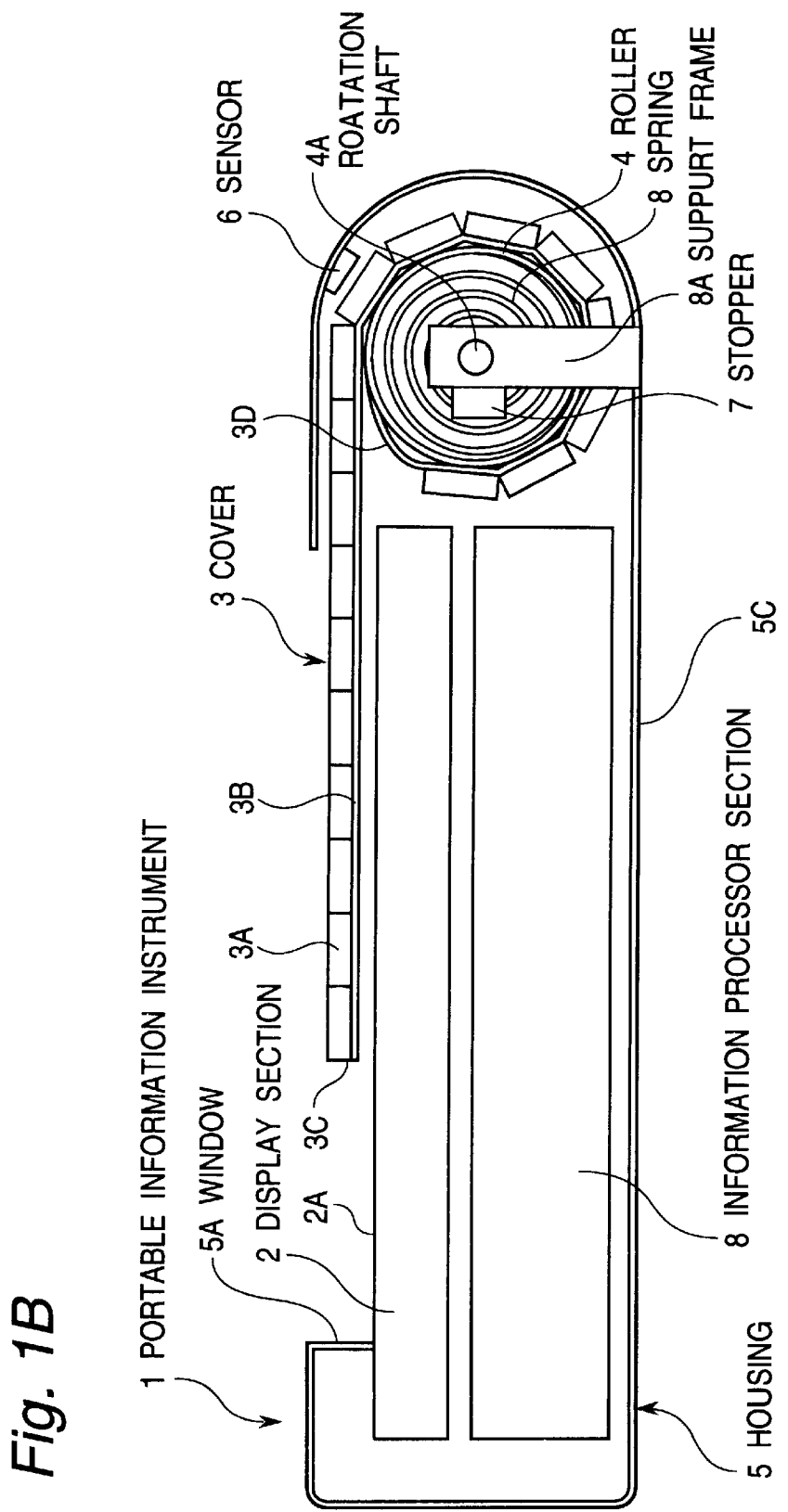

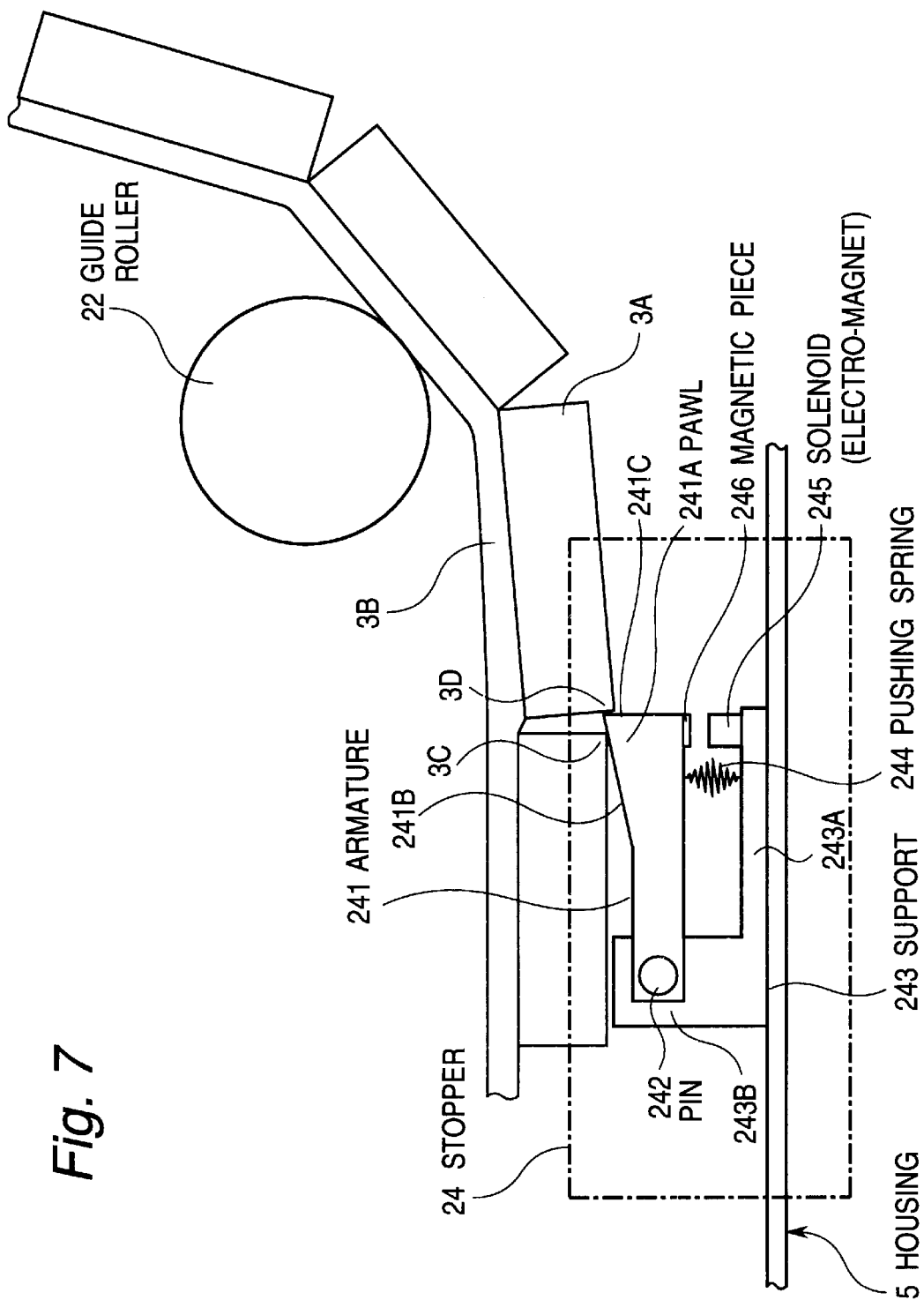

PORTABLE INFORMATION INSTRUMENT HAVING A DISPLAY COVER PROTECTING A DISPLAY SCREEN

BACKGROUND OF THE INVENTION

1. Field of the Invention

The present invention relates to a portable information instrument, and more specifically to a portable information instrument having a display cover protecting a display screen.

2. Description of Related Art

Prior art portable information instruments includes ones which have an upper cover for protecting a display screen of a display section composed of a liquid crystal display. For example, the upper cover is joined to a body of the portable information instrument by more than one hinge, so that the upper cover can be opened and closed without being separated from the body of the portable information instrument.

In the above mentioned cover structure, in order to prevent the upper cover from being unintentionally opened, there is provided a lock mechanism for locking the upper cover into the body of the portable information instrument in the closed condition. In use, an operator manually releases the lock mechanism, and opens the upper cover to a position where the display screen of the display section is exposed, or alternatively rotates the upper cover so that the upper cover rides on a rear surface of the body of the portable information instrument.

For example, Japanese Utility Model Application Pre-examination Publication No. JP-U-63-44549 discloses a handy portable telephone having a cover hinged to a portable telephone body to be selectively latched to a first position covering an operating key section or to a second position covering a display section. Japanese Patent Application Pre-examination Publication No. JP-A-6-334778 discloses a communication terminal having a cover closed to protect an operating section and a display section and configured to automatically open the cover by means of a motor when a calling is received.

In the above mentioned prior art portable information instrument, the upper cover is hinged to the portable information instrument body by more than one hinge. However, since the upper cover has to cover the display section which occupies a large portion of an instrument front surface area, the upper cover interferes with operation of the portable information instrument, or makes it instable to hold the portable information instrument by a hand, or becomes hindrance to start to use the portable information instrument in a congested condition.

Furthermore, in the case that when the upper cover is opened the cover is rotated to the rear surface of the portable information instrument body, a space larger than the portable information instrument body is temporarily occupied by the opening and closing of the cover, resulting in hindrance to start to use the portable information instrument in the congested condition.

Furthermore, when the portable information instrument has the lock mechanism for locking the upper cover into the body of the portable information instrument in the closed condition, it is necessary that, in order to view the display section, the operator manually releases the lock mechanism by his hand each time so as to open the cover. Therefore, even if an alarm for a schedular is set in the portable information instrument, when the alarm is sounded, the operator cannot immediately known or confirm the content of the alarm.

Still further, in the portable information instrument having the cover to be automatically opened by means of a motor, it is a general practice to supply an electric power to the motor from a battery cell of the portable information instrument. On the other hand, for miniaturization and the weight-reducing of the portable information instrument, an enough battery cell capacity cannot be ensured. Therefore, if it is attempted to open the cover by the motor, the electric power is wastefully consumed by the operation of the motor, so that the battery cell capacity which can be used by the portable information instrument itself is correspondingly reduced.

SUMMARY OF THE INVENTION

Accordingly, it is an object of the present invention to provide a portable information instrument which has overcome the above mentioned defects of the conventional ones.

Another object of the present invention is to provide a portable information instrument having a cover which protects a display screen and which can be opened and closed without interfering with operation of the portable information instrument body.

Still another object of the present invention is to provide a portable information instrument having a cover which protects a display screen and which can be automatically opened to expose the display screen in response to activation of the alarm, with no necessity of manually opening the cover by an operator's hand.

A further object of the present invention is to provide a portable information instrument which has a cover protecting a display screen and which can minimize the electric power consumption required for the opening and closing operation of the cover, so as to minimize influence of the opening and closing operation of the cover onto the battery cell capacity to be used by the portable information instrument.

The above and other objects of the present invention are achieved in accordance with the present invention by a portable information instrument including a housing having an window, a display means accommodated within the housing and having a display screen exposed in the window to display data processed in the portable information instrument, a cover sheet for protecting the display screen, the cover sheet being formed of a soft back sheet and a plurality of rectangular hard pieces fixed on the back sheet, and an accommodating means for retracting the cover sheet from a position covering the display screen into an inside of the housing.

With the above mentioned arrangement of the portable information instrument, since the cover sheet for protecting the display screen is formed of the soft back sheet and the plurality of rectangular hard pieces fixed on the back sheet, the cover sheet has a strength required for protecting the display screen, and on the other hand, the cover sheet can be accommodated into a limited space within the housing.

In one embodiment, the portable information instrument further includes an inhibiting means for inhibiting accommodation of the cover sheet into the inside of the housing by the accommodating means, to allow the cover to be freely retracted until an arbitrary position.

Furthermore, in the embodiment of the portable information instrument, the inhibiting means includes a release means for releasing the inhibition of the accommodation by the inhibiting means, of the cover sheet into the inside of the housing, in response to a control instruction given when the inhibiting means inhibits the accommodation of the cover sheet into the inside of the housing by the accommodating means.

In addition, the embodiment of the portable information instrument can further include a counting means for counting the number of the rectangular hard pieces which have been accommodated into the inside of the housing, and a control means for controlling the inhibiting means to inhibit the accommodation of the cover sheet into the inside of the housing by the accommodating means, when a count value of the counting means reaches a predetermined value.

In this embodiment, it is possible to automatically open the cover sheet until the position of displaying a necessary information, and on the other hand, a portion of the display screen which is not used for displaying the necessary information, is still protected by the cover sheet.

Moreover, in the embodiment of the portable information instrument, the accommodating means can include a spring member functionally coupled to the cover sheet for accumulating a pulling-out force expended when the cover sheet was pulled out from the inside of the housing, and for attracting the cover sheet into the inside of the housing by action of the accumulated pulling-out force when the cover sheet is to be accommodated into the inside of the housing. Furthermore, the accommodating means can include a winding mechanism located in the inside of the housing, for winding up the cover sheet, or alternatively a retracting mechanism located in the inside of the housing, for retracting the cover sheet into the inside of the housing.

In this embodiment, no motor is used for opening and closing the cover sheet. Furthermore, since the cover sheet is extracted into the inside of the housing by use of the pulling-out force or energy which was accumulated when the cover sheet was pulled out from the inside of the housing, it is possible to minimize the electric power consumption required for the opening/closing operation of the cover sheet protecting the display screen of the display means, with the result that it is possible to minimize influence of the opening/closing operation of the cover onto the battery cell capacity to be used by the portable information instrument.

The above and other objects, features and advantages of the present invention will be apparent from the following description of preferred embodiments of the invention with reference to the accompanying drawings.

BRIEF DESCRIPTION OF THE DRAWINGS

FIG. 1A is a diagrammatic perspective view of a first embodiment of the portable information instrument in accordance with the present invention;

FIG. 1B is a diagrammatic side view of the first embodiment of the portable information instrument shown in FIG. 1A, in a condition in which a side panel is removed;

FIG. 7 is a diagrammatic plan view of the stopper mechanism incorporated in the portable information instrument shown in FIG. 6.

DESCRIPTION OF THE PREFERRED EMBODIMENTS

Figure 2:
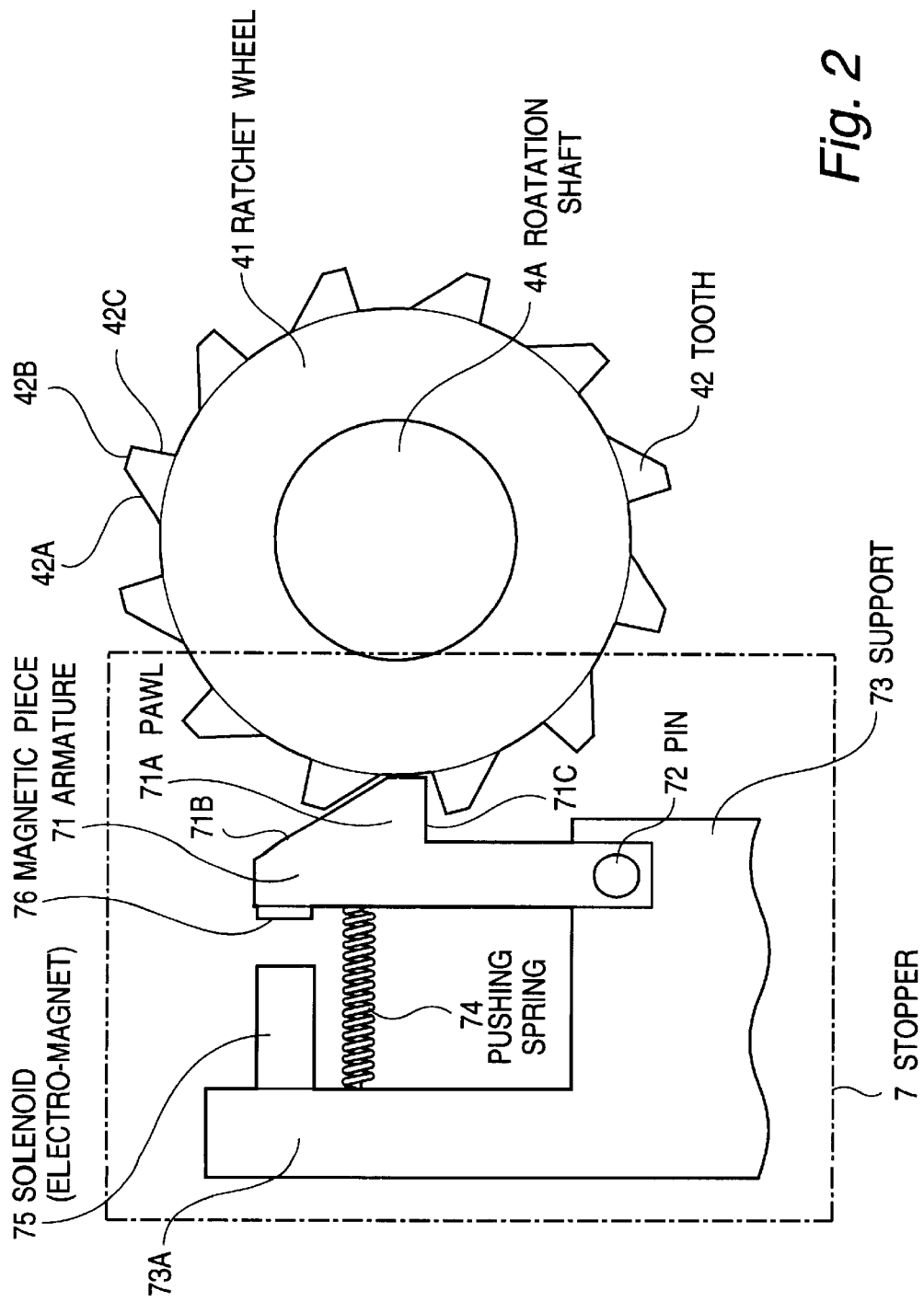
FIG. 2 is a diagrammatic plan view of the stopper mechanism incorporated in the portable information instrument shown in FIGS. 1A and 1B.

Referring to FIG. 1A, there is shown a diagrammatic perspective view of a first embodiment of the portable information instrument in accordance with the present invention. FIG. 1B is a diagrammatic side view of the first embodiment of the portable information instrument shown in FIG. 1A in a condition in which a side panel is removed.

The shown portable information instrument is generally designated with Reference Numeral 1, and is, for example, a personal digital assistants (abbreviated to "PDA"), also called an "electronic pocketbook"or a "massage pad", or a handheld pen computer, which have a relatively large display and input interface section occupying a major portion of a front surface of the portable information instrument. The shown portable information instrument 1 includes a housing 5, a display section 2 incorporated in the housing 5 so that a front surface (display screen) 2A of the display section 2 is exposed in a large window 5A formed in a front panel 5B of the housing 5, and an information processor section 8 located in a space between the display section 2 and a back panel 5C of the housing 5. The display section 2 is formed of for example a liquid crystal display (LCD). The above mentioned construction is well known to persons skilled in the art, and therefore, further explanation will be omitted.

In accordance with the present invention, the shown portable information instrument has a cover sheet 3 for protecting the front surface (namely, the display screen) 2A of the display section 2. This cover sheet 3 is composed of a soft back sheet 3B having a rear surface facing to the front surface (namely, the display screen) 2A of the display section 2, and a plurality of small elongated rectangular hard pieces 3A each having a rear surface thereof bonded to an upper surface of the soft back sheet 3B. These small elongated rectangular pieces 3A extend in a direction in parallel to an axis of a roller 4 which will be described hereinafter. The small rectangular pieces 3A are located in parallel to one another on the soft back sheet 3B, with either no substantial space or only a small space remaining between each pair of adjacent rectangular pieces 3A (in a direction perpendicular to the axis of the roller 4) when the cover sheet 3 is in a flat condition. For example, the small rectangular pieces 3A are formed of a metal or a resin, and the soft back sheet 3B is formed of a resilient resin sheet.

One end 3C of the cover sheet 3 is a free end, and the other end 3D of the cover sheet 3 is fixed to the roller 4, which is rotatably located within the housing 5 at one side of the portable information instrument 1. In brief, the roller 4 is fixed to a rotating shaft 4A which is rotatably supported by a supporting frame 8A extending form the housing 5. The roller 4 has a winding mechanism for winding up the cover sheet 3 which has been reeled off from the roller. A stopper mechanism 7 is mounted on the supporting frame 8A to stop a rotation of the roller 4.

The winding mechanism is formed of for example a spiral spring 8 as shown in FIG. 1B or a coil spring (not shown). The spiral spring 8 has one end fixed to the supporting frame 8A and the other end fixed to the roller 4, so that the spiral spring 8 is biased to exert a force of rotating the roller 4 in a direction of winding up the cover sheet 3. The stopper mechanism 7 is configured to act only in a rotating direction of the roller 4 for winding up the cover sheet 3, but does not function as the stopper when the cover sheet 3 is pulled out, namely, when the cover sheet 3 is reeled off from the roller 4.

Furthermore, a sensor 6 is mounted on an inside surface of the housing 5 at a position facing the rectangular piece 3A of the cover sheet 3 just wound around the roller 4. At each time the rectangular piece 3A passes before the sensor 6, the sensor 6 detects the rectangular piece, 3A and generates a detection signal. The display section 2, the sensor 6 and the stopper mechanism 7 are electrically connected to the information processor section 8, as will be described in detail hereinafter.

Referring to FIG. 2, there is shown a diagrammatic plan view of the stopper mechanism 7 incorporated in the portable information instrument 1. The stopper mechanism 7 includes a support 73 has a base fixed to the support frame 8A and an arm 73A extending from the base, and an armature 71 having a base end rotatably mounted on the base of the support 73 through a pin 72. The armature 71 extends from the base end thereof substantially in parallel to the arm 73A of the support 73. A tip end of the armature 71 has a magnetic piece 76 fixed on an inside surface thereof and a pawl 71A extending outwardly from an outside surface thereof. This magnetic piece 86 is formed of for example an iron piece.

An elastic member such as a pushing spring 74 in a compressed condition is connected between the arm 73A of the support 73 and the armature 71, for exerting a biasing force of pushing the armature 71 in a direction separating from the arm 73A of the support 73. A solenoid, namely, an electro-magnet 75 is mounted on a surface of the arm 73A of the support 73 to face the magnetic piece 76 fixed to the tip end of the armature 71, so that when the electro-magnet 75 is energized, the electro-magnet 75 attracts the magnetic piece 76 against the pushing spring 74, with the result that the magnetic piece 76 is brought into contact with the electro-magnet 75.

Furthermore, a ratchet wheel 41 having a plurality of teeth 42 is fixed to the rotating shaft 4A. Each tooth 42 of the ratchet wheel 41 has a gradual slope frank 42A having a large frank angle, namely a small angle between the frank surface 42A and a top surface 42B of the tooth, and a steep slope frank 42C having a small frank angle, namely a large angle between the frank surface 42C and the top surface 42B of the tooth. On the other hand, the pawl 71 of the armature 71 is shaped in the form complementary to the tooth 42 of the ratchet wheel 41 so that the pawl 71 can engage between adjacent teeth 42 of the ratchet wheel 41. Specifically, the pawl 71 has a gradual slope face 71B having a small angle between the face 71B and a top surface of the pawl 71A, namely, complementary to the gradual slope frank 42A of the tooth 42, and a steep slope face 71C having a large angle between the face 71C and the top surface of the pawl 71A, namely, complementary to the steep slope frank 42C of the tooth 42. When the electro-magnet 75 is in a deenergized condition, the armature 76 is ceaselessly pushed by action of the pushing spring 74 so that the pawl 71A is engaged between adjacent teeth 42 of the ratchet wheel 41 in such a manner that the gradual slope face 71B of the pawl 71A faces the gradual slope frank 42A of the tooth 42 and the steep slope face 71C of the pawl 71A faces the steep slope frank 42C of the tooth 42.

With the above mentioned arrangement, when the cover sheet 3 is pulled out from the housing 5, namely, when the cover sheet 3 is reeled off from the roller 4, the rotating shaft 4A of the roller 4 rotates counterclockwise in FIGS. 1B and 2. In this case, since the gradual slope face 71B of the pawl 71A contacts the gradual slope frank 42A of the tooth 42, the rotating shaft 4A of the roller 4 rotates counterclockwise against the biasing force of the pushing spring 74 while pushing and displacing the armature 71 toward the electro-magnet 75.

On the other hand, when the shaft 4A of the roller 4 rotates clockwise to wind up the cover sheet 3, the steep slope face 71C of the pawl 71A is brought into contact with the steep slope frank 42C of the tooth 42, so that the tooth 42 of the ratchet wheel 41 cannot push the armature 71 toward the electro-magnet 75, and the pawl 71A is locked between the teeth 42 by action of the pushing spring 74. As a result, the clockwise rotation of the roller 4 winding up the cover is prevented or inhibited.

However, if the electro-magnet 75 is energized, the magnetic piece 76 is attracted to be brought into contact with the electro-magnet 75 against the biasing force of the pushing sprig 74, with the result that the pawl 71A of the armature 71 is released from between the teeth 42 of the ratchet wheel 41, so that the shaft 4A of the roller 4 rotates clockwise by action of the spiral spring 8, so as to wind up the cover sheet 3 around the roller 4.

Figure 3:
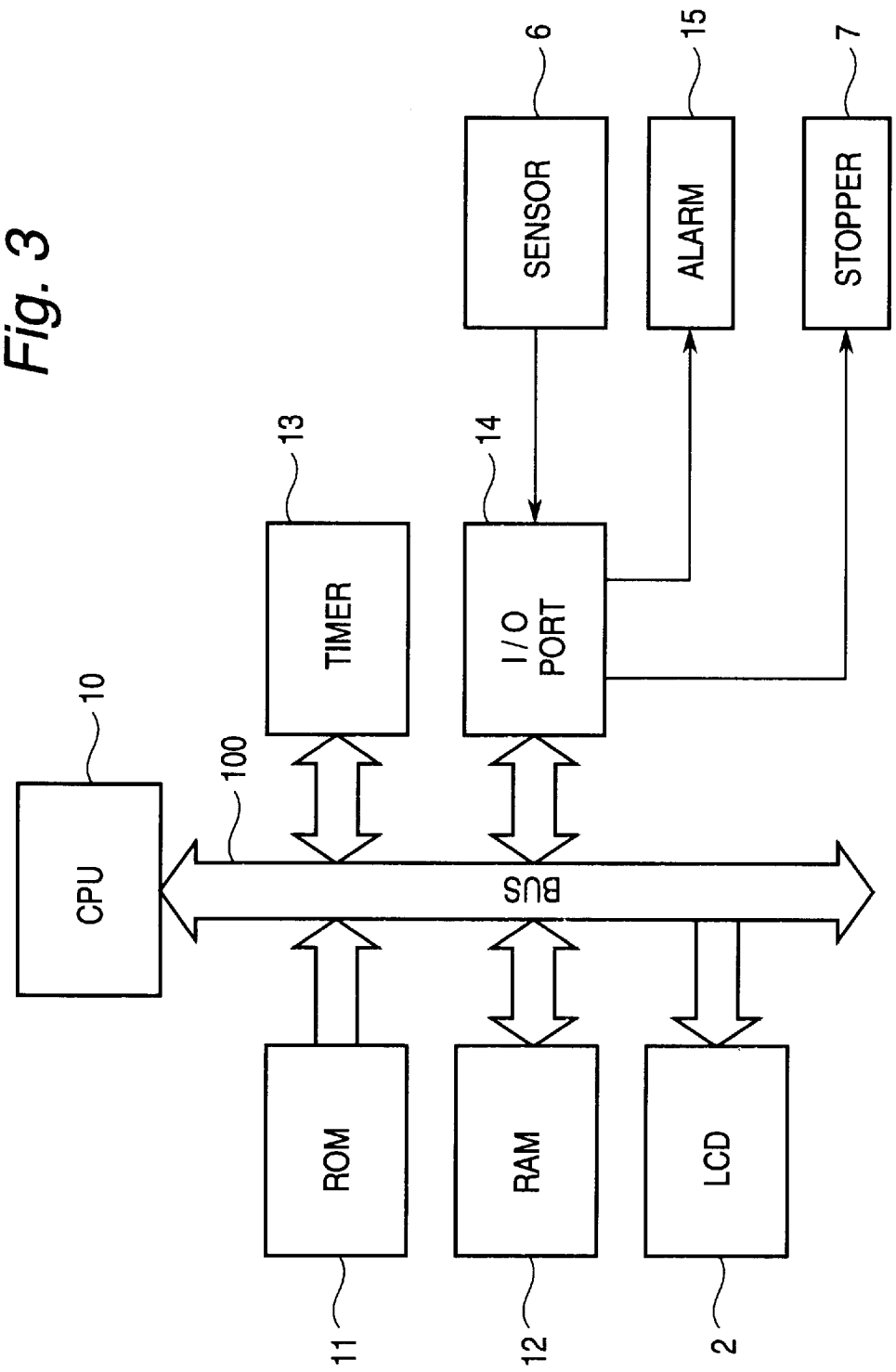
FIG. 3 is a block diagram of the information processor section in the portable information instrument shown in FIGS. 1A and 1B.

Referring to FIG. 3, there is shown a block diagram of the information processor section 8 in the portable information instrument shown in FIGS. 1A and 1B. The information processor section 8 includes a CPU (central processing unit) 10, which is coupled through a bus 100 to a ROM (read only memory) 11, a RAM (random access memory) 12, a timer 13 and an I/O (input/output) port 14. To the bus 100, the display section (namely, LCD) 2 is also coupled. The I/O port 14 is connected to the sensor 6, the stopper 7 and an alarm 15. The ROM 11 stores various programs including a schedular. As mentioned hereinbefore, the sensor 6 generates the detection signal at each time the small rectangular piece 3B passes before the sensor 6.

Figure 4:
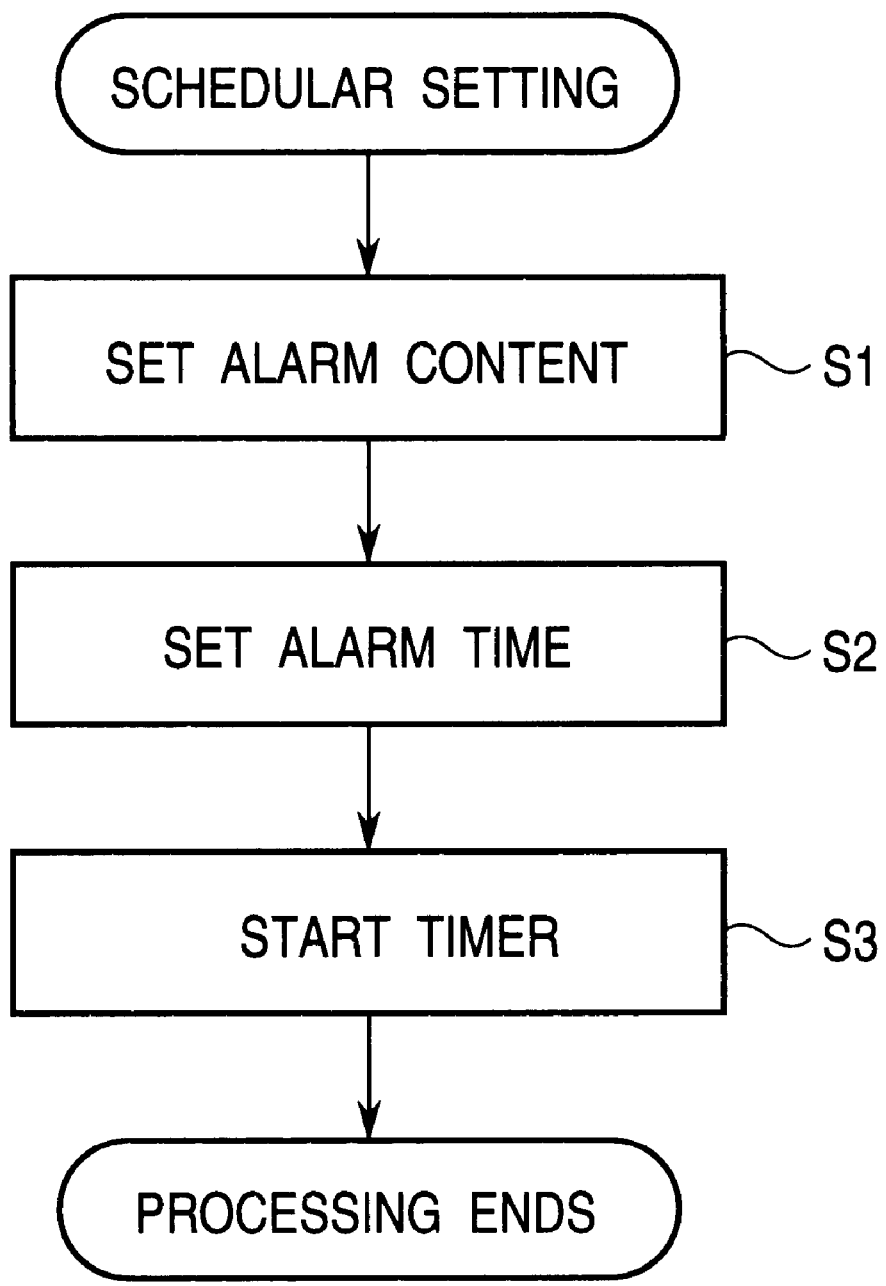
FIG. 4 is a flow chart illustrating a schedular setting operation for the portable information instrument shown in FIGS. 1A and 1B.
Figure 5:
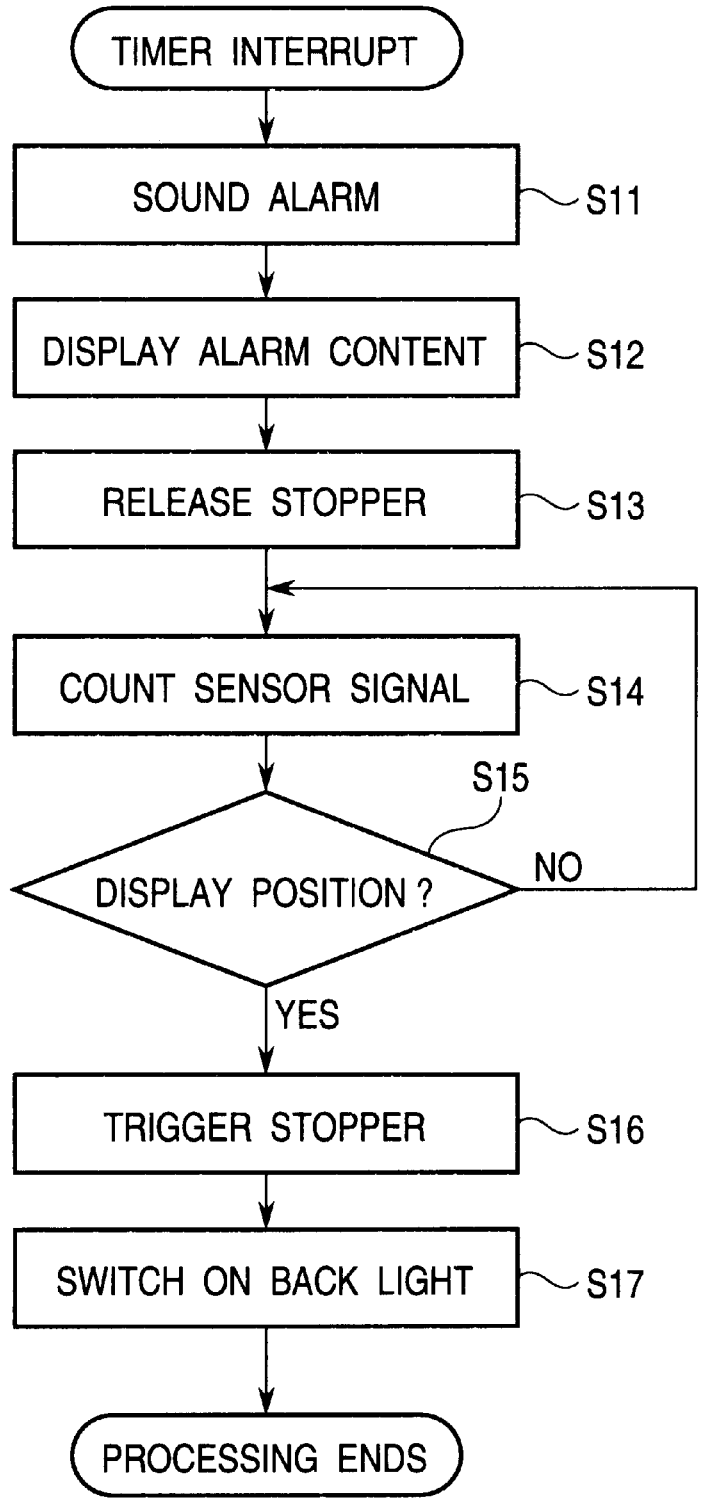
FIG. 5 is a flow chart illustrating an alarm processing in the portable information instrument shown in FIGS. 1A and 1B.

FIG. 4 is a flow chart illustrating a schedular setting operation for the portable information instrument shown in FIGS. 1A and 1B. FIG. 5 is a flow chart illustrating an alarm processing in the portable information instrument shown in FIGS. 1A and 1B.

Now, an operation of the portable information instrument shown in FIGS. 1A and 1B will be described with reference to FIGS. 1A, 1B, 2, 3, 4 and 5.

When the portable information instrument 1 is in a non-use condition, the cover 5 is pulled out from the housing 5 to cover the display screen 2A of the display section 2, and the cover 5 is stationarily maintained by the armature 71 of the stopper mechanism 7. Namely, the steep slope surface 71C of the pawl 71A of the armature 71 of the stopper mechanism 7 is engaged with the steep slope frank 42C of the tooth 42 of the ratchet wheel 41, so that the rotation of the roller 4 is inhibited.

When the portable information instrument is used, the electro-magnet 75 is energized to attract the magnetic piece 76 and hence the tip end of the armature 71 against the pushing spring 74 under control of the CPU 10 of the information processor section 8, so that the armature 71 of the stopper mechanism 7 is released from between the teeth 42 of the ratchet wheel 41. As a result, the cover sheet 3 is wound up around the roller 4 by action of the force which was accumulated in the spiral spring 8 when the cover sheet 3 was reeled off from the roller 4 so that the cover sheet 3 is accommodated in the housing 5.

In the above mentioned cover accommodating process, at each time the small rectangular piece 3A passes before the sensor 6, the sensor 6 generates the detection signal, which is supplied through the I/O port 14 to the CPU 10 of the information processor section 8. The CPU 10 counts the detection signal generated by the sensor 6, in order to measure the number of the small rectangular pieces 3A which have passed before the sensor 6. When the counted value reaches a predetermined value, which can be arbitrarily set, the CPU 10 of the information processor section 8 deenergizes the electro-magnet 75 to allow the magnetic piece 76 and hence the tip end of the armature 71 to be released from the electro-magnet 75 by action of the pushing spring 74, so that the pawl 71A of the armature 71 of the stopper mechanism 7 is engaged or locked with the teeth 42 of the ratchet wheel 41, again. Namely, the steep slope surface 71C of the pawl 71A of the armature 71 of the stopper mechanism 7 is engaged with the steep slope frank 42C of the tooth 42 of the ratchet wheel 41, so that the rotation of the roller 4 is inhibited again. Thus, the cover winding-up operation is terminated.

When use of the portable information instrument is completed and the cover sheet 3 is closed, the operator 3 pulls out the cover sheet 3 from the housing 3 by his hand until the display section 2 is completely covered by the cover sheet 3. At this time, the CPU 10 counts the detection signal generated by the sensor 6 at each time the small rectangular piece 3A passes before the sensor 6, so that the CPU 10 can know the position of the cover sheet 3 pulled out from the housing 5.

As mentioned above, the ROM 11 of the information processor section 8 stores various programs including the schedular. If a schedule alarm is set by the operator, the CPU sets the content of the alarm (Step S1 in FIG. 4), and sets a designated time in the timer 13 (Step S2 in FIG. 4), and further, starts the timer 13 (Step S3 in FIG. 4).

When the timer 13 reaches the designated time, the timer 13 generates a timer interrupt to the CPU 10, as shown in FIG. 5. In response to the timer interrupt, the CPU 10 sounds the alarm (Step S11 in FIG. 5), and further, displays the content of the alarm in the display section 2 (Step S12 in FIG. 5).

Thereafter, the CPU 10 outputs a control signal to the I/O port 14 to release inhibition of rotation of the roller 4 by the stopper mechanism 7 (Step S13 in FIG. 5), and counts the number of the small rectangular piece 3A by counting the detection signal generated the sensor 6 at each time the small rectangular piece 3A passes before the sensor 6 (Step S14 in FIG. 5). More specifically, in the stopper mechanism 7, the electro-magnet 75 is energized to attract the magnetic piece 76 so that the pawl 71A of the armature 71 is released or unlocked from between the teeth 42 of the ratchet wheel 41. As a result, the rotating shaft 4A of the roller 4 rotates clockwise by action of the force which was accumulated in the spiral spring 8. Namely, the cover sheet 3 is wound up around the roller 4 so that the display screen of the display section 2 is exposed.

The CPU 10 watches whether or not the cover sheet 3 is wound up around the roller 4 until a position displaying the content of the alarm, namely, whether or not the counted number of the detection signal from the sensor 6 reaches the number corresponding to the position displaying the content of the alarm (Step S15 in FIG. 5). If it has not yet reached, the CPU 10 continues to count the detection signal from the sensor 6. If it has reached, the CPU 10 outputs another control signal to the I/O port 14 to activate the stopper mechanism 7 again to stop the winding-up operation of the cover sheet 3 (Step S16 in FIG. 5). Then, the CPU 10 switches on a back light (not shown) of the display section 2 (Step S17 in FIG. 5).

The above mentioned embodiment has been so configured that under control of the CPU 10, the stopper mechanism 7 operates to inhibit the rotation of the roller 4 and to release the inhibition of rotation of the roller 4. However, it would be a matter of course to persons skilled in the art to provide a stopper control key or bottom on the housing 5 so that when the stopper control key is depressed the stopper mechanism 7 operates to inhibit the rotation of the roller 4 and/or to release the inhibition of rotation of the roller 4.

Figure 6:
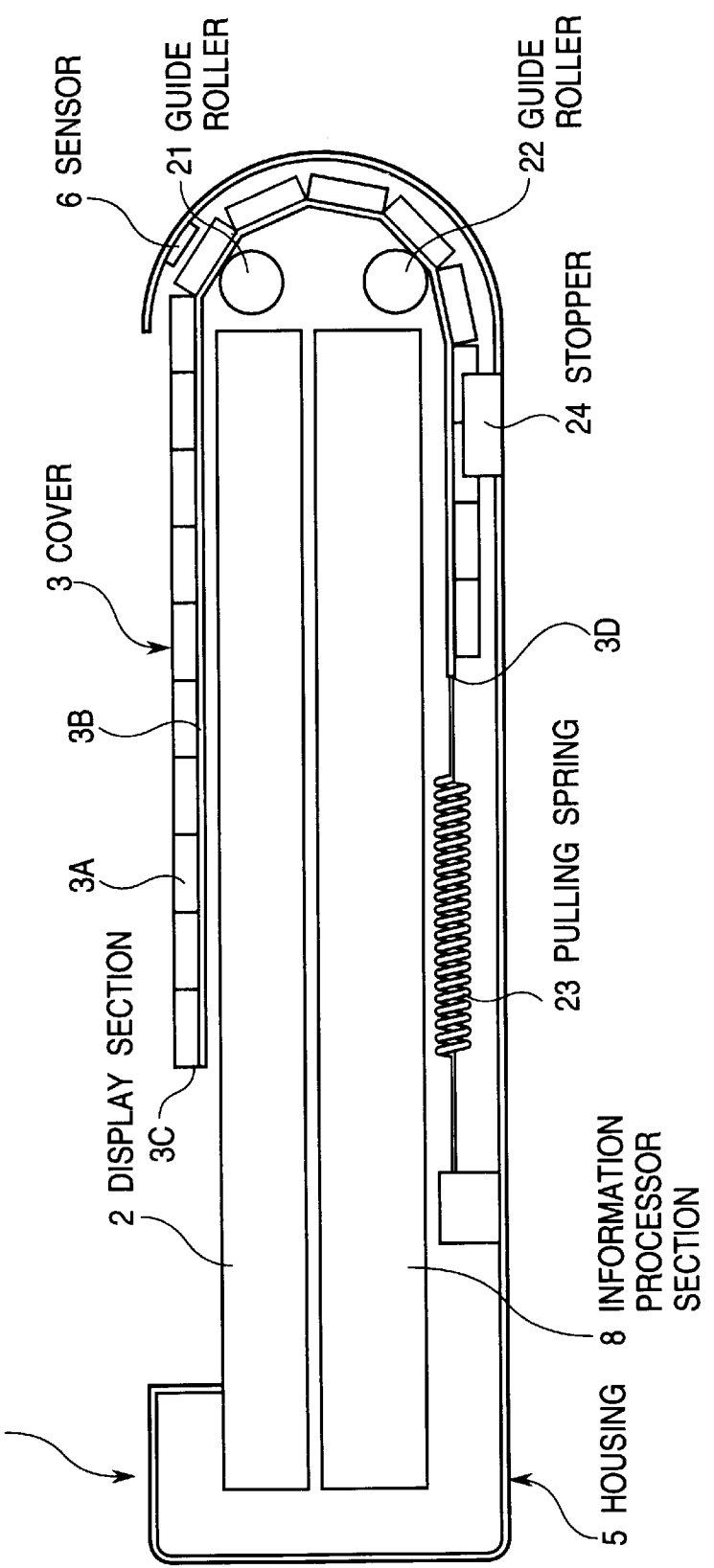
FIG. 6 is a view similar to FIG. 1B but showing a second embodiment of the portable information instrument in accordance with the present invention.

Referring to FIG. 6 is a view similar to FIG. 1B but showing a second embodiment of the portable information instrument in accordance with the present invention, In FIG. 6, elements similar to those shown in FIG. 1B are given the same Reference Numerals, and explanation thereof will be omitted for simplification of description.

As seen from comparison between FIG. 1B and FIG. 6, the second embodiment is similar to the first embodiment, except that, in place of winding up the cover sheet 3 by the roller 4, the cover sheet 3 is extracted by a pulling spring 23 while being guided by guide rollers 21 and 22, and a different stopper mechanism 24 is provided in place of the stopper mechanism 7.

The rollers 21 and 22 are rotatably located in parallel to each other within the housing 5 at the one side of the portable information instrument 1 where the roller 4 was located in the first embodiment. The cover sheet 3 is located to extend from on the front surface of the display section 2, to pass through a space between the housing 5 and the rollers 21 and 22 so as to turn its direction, and then to extend between the housing 5 and the information processor section 8 in a direction opposite to the extending direction on the front surface of the display section 2. The other end 3D of the cover sheet 3 is joined to one end of the pulling spring 23 located in a space between the housing 5 and the information processor section 8, and the other end of the pulling spring 23 is fixed to the housing 5. Therefore, the cover sheet 3 is biased to be extracted into the inside of the housing 5 by the pulling spring 23. In addition, the stopper mechanism 24 is located in the space between the housing 5 and the information processor section 8, at a midway of an extracting course of the cover sheet 3.

Referring to FIG. 7, there is shown a diagrammatic plan view of the stopper mechanism 24 incorporated in the portable information instrument shown in FIG. 6. The stopper mechanism 24 includes a support 243 having a base 243A fixed to an inner surface of the housing 5 and having an arm 243B upstanding from the base 243A, and an armature 241 having a base end rotatably mounted on the arm 243B of the support 243 through a pin 242 and extending substantially in parallel to the base 243A of the support 243. A tip end of the armature 241 has a magnetic piece 246 fixed on a lower surface thereof and a pawl 241A extending upward from an upper surface thereof This magnetic piece 86 is formed of for example an iron piece. The pawl 241A has a gradual slope face 241B and a steep slope face 241C, which is substantially in parallel to an end face of the small rectangular piece 3A.

An elastic member such as a pushing spring 244 in compressed condition is connected between the base 243A of the support 243 and the armature 241, for exerting a biasing force of pushing the armature 241 in a direction separating from the base 243A of the support 243. A solenoid, namely, an electro-magnet 245 is mounted on an upper surface of the base 243A of the support 243 to face the magnetic piece 246 fixed to the tip end of the armature 241, so that when the electro-magnet 245 is energized, the electro-magnet 245 attracts the magnetic piece 246 against the pushing spring 244 with the result that the magnetic piece 246 is brought into contact with the electro-magnet 245.

When the cover sheet 3 is pulled out from the housing 5 against the pulling spring 23, a corner 3C of each small rectangular piece 3A is abutted on the gradual slope face 241B of the pawl 241A, and therefore, is caused to slide on the gradual slope face 241B while pushing the armature 241 toward the electro-magnet 245 against the pushing spring 244. Therefore, the cover sheet 3 can be freely pulled out from the housing 5.

On the other hand, when the cover sheet 3 is retracted or pulled into the housing by action of the pulling spring 23, an opposite corner 3D of the small rectangular piece 3A is abutted on the steep slope face 241C of the pawl 241A. Therefore, the opposite corner 3D of each small rectangular piece 3A cannot push the armature 241 toward the electro-magnet 245 against the pushing spring 244, with the result that the retracting operation of the cover sheet 3 into the housing 5 is inhibited. In this case, since the back sheet 3B is formed of the soft material, the gradual slope face 241B of the pawl 241A of the armature 241 pushes the small rectangular piece 3A in a direction separating from the electro-magnet 245, by action of the pushing spring 244, with the result that the steep slope face 241C of the pawl 241A is surely abutted onto an end surface of a next small rectangular piece 3A, namely, the opposite corner 3D of the next small rectangular piece 3A. In this connection, the stopper mechanism 24 is preferably located in proximity of the guide roller 22 as shown in FIG. 7, in order to more surely cause the steep slope face 241C of the pawl 241A to be abutted onto the end surface of the next small rectangular piece 3A.

However, when the electro-magnet 245 is energized, the magnetic piece 246 is attracted to the electro-magnet 245, so that the pawl 241A of the armature 241 is released from the end surface of the small rectangular piece 3A, and therefore, the small rectangular piece 3A is allowed to slide without being disturbed by the pawl 241A of the armature 241 with the result that the cover sheet 3 is retracted by action of the pulling spring 23.

As seen from the above, the portable information instrument in accordance with the present invention is so constructed that, the cover sheet 3 covering the display screen of the display section 2 accommodated in the housing 5 but exposed within the window 5A of the housing to display data processed by the information processor section, is formed of the plurality of small elongated rectangular hard pieces 3A bonded on the soft back sheet 3B, and the cover sheet 3 thus formed is accommodated in the inside of the housing 5 by winding up the cover sheet around the roller 4 biased by the spiral spring 8, or alternatively by pulling the cover sheet by the pulling spring 23. Therefore, when the portable information instrument is in use, the cover sheet 3 is never located at an outside of the housing 5, and the space occupied by the portable information instrument does not change by the opening and closing of the cover sheet 3. Accordingly, the cover 5 no longer interferes with operation of the portable information instrument, nor does it make it instable to hold the portable information instrument by a hand, nor does it become hindrance to start to use the portable information instrument in a congested condition. Thus, it is possible to open and close the cover sheet 3 covering the display screen of the display section 2 without disturbing the operation of the portable information instrument.

Furthermore, the portable information instrument in accordance with the present invention is also so constructed that, there is provided the stopper mechanism 7 or 24 configured to inhibit the accommodation of the cover sheet 3 into the inside of the housing 5 by action of the roller 4 or the pulling spring 23, thereby to permit the cover sheet 3 to be accommodated until an arbitrary position. In addition, the stopper mechanism 7 or 24 is also configured to respond to an internal instruction from the CPU 10 or alternatively an external instruction, to release the inhibition of the accommodation of the cover sheet 3 into the housing 5. Therefore, when the stopper mechanism 7 or 24 inhibits the accommodation of the cover sheet 3 into the inside of the housing 5, if the inhibition of the accommodation of the cover sheet 3 into the housing 5 by the stopper mechanism 7 or 24 is released by energizing the electro-magnet 75 and 245 in response to the instruction from the CPU 10 or the external instruction, the cover sheet 3 is automatically opened to a position of displaying the content of the alarm. Accordingly, when the alarm is sounded, the operator can know or confirm the content of the alarm with no troublesome operation opening the cover by the operator at each time the alarm is sounded.

Namely, when the alarm is sounded at a preset time, the display screen of the display section 2 can be automatically exposed in response to the sounding of the alarm with no necessity of manually performing an opening/closing operation of the cover sheet 3 protecting the display screen.

Moreover, the portable information instrument in accordance with the present invention is also so constructed that, the cover sheet 3 is accommodated into the inside of the housing 5 by action of the roller 4 biased by the spiral spring 8 or by action of the pulling spring 23, and only when the inhibition of the accommodation of the cover sheet 3 into the housing 5 is to be released, the electro-magnet 75 and 245 is energized to allow the cover sheet 3 to be accommodated into the housing 5 by action of the roller 4 or the pulling spring 23. Accordingly, no motor is used for operating the cover sheet 3. Furthermore, a pulling-out force or energy which was expended when the cover sheet 3 was pulled out from the inside of the housing 5, is accumulated in the spiral spring 8 of the roller 4 or in the pulling spring 23, and the accumulated force or energy is re-used to extract the cover sheet 3 into the inside of the housing 5. An electric power consumption is minimized when the cover sheet 3 for the display section 2 is automatically opened.

Accordingly, it is possible to minimize the electric power consumption required for the opening/closing operation of the cover sheet 3 protecting the display screen of the display section 2, with the result that it is possible to minimize influence of the opening/closing operation of the cover onto the battery cell capacity allowed to be used by the portable information instrument The invention has thus been shown and described with reference to the specific embodiments. However, it should be noted that the present invention is in no way limited to the details of the illustrated structures but changes and modifications may be made within the scope of the appended claims.

I claim:

1. A portable information instrument including a housing having an window, a display means accommodated within said housing and having a display screen exposed in said window to display data processed in the portable information instrument, a cover sheet for protecting said display screen, said cover sheet being formed of a soft back sheet and a plurality of rectangular hard pieces fixed on said back sheet, and an accommodating means for retracting said cover sheet from a position covering said display screen into an inside of said housing.

2. A portable information instrument claimed in claim 1 further including an inhibiting means for inhibiting accommodation of said cover sheet into the inside of said housing by said accommodating means, to allow said cover to be freely retracted until an arbitrary position.

3. A portable information instrument claimed in claim 2 wherein said inhibiting means includes a release means for releasing the inhibition of the accommodation by said inhibiting means, of said cover sheet into the inside of said housing, in response to a control instruction given when said inhibiting means inhibits the accommodation of said cover sheet into the inside of said housing by said accommodating means.

4. A portable information instrument claimed in claim 3 further including a counting means for counting the number of said rectangular hard pieces which have been accommodated into the inside of said housing, and a control means for controlling said inhibiting means to inhibit the accommodation of said cover sheet into the inside of said housing by said accommodating means, when a count value of said counting means reaches a predetermined value.

5. A portable information instrument claimed in claim 4 wherein said accommodating means includes a spring member functionally coupled to said cover sheet for accumulating a pulling-out force expended when said cover sheet was pulled out from the inside of said housing, and for attracting said cover sheet into the inside of said housing by action of the pulling-out force accumulated when said cover sheet is to be accommodated into the inside of said housing.

6. A portable information instrument claimed in claim 1 wherein said accommodating means includes a winding mechanism located in the inside of said housing, for winding up said cover sheet to accommodate said cover sheet into the inside of said housing.

7. A portable information instrument claimed in claim 6 further including a stopper mechanism configured to lock rotation of a rotating shaft of said winding mechanism thereby inhibiting a winding up of said cover sheet by said winding mechanism, so that said cover sheet is accommodated until an arbitrary position.

8. A portable information instrument claimed in claim 7 further including a release means for releasing the inhibition of said winding up by said stopper mechanism, of said cover sheet around said winding mechanism, in response to a control instruction given when said stopper mechanism inhibits said winding up of said cover sheet around said winding mechanism.

9. A portable information instrument claimed in claim 8 further including a counting means for counting the number of said rectangular hard pieces which have been accommodated into the inside of said housing, and a control means for controlling said stopper mechanism to inhibit said winding up of said cover sheet around said winding mechanism, when a count value of said counting means reaches a predetermined value.

10. A portable information instrument claimed in claim 9 wherein said winding mechanism includes a roller for winding up said cover sheet and a spiral spring functionally coupled to said roller for accumulating a pulling-out force expended when said cover sheet was reeled out from said roller, and for re-winding said cover sheet around said roller by action of the pulling-out force accumulated when said cover sheet was reeled out from said roller.

11. A portable information instrument claimed in claim 1 wherein said accommodating means includes a retracting mechanism located in the inside of said housing, for retracting said cover sheet into the inside of said housing.

12. A portable information instrument claimed in claim 11 further including a stopper mechanism configured to lock said cover sheet thereby inhibiting a retraction of said cover sheet by said retracting mechanism, so that said cover sheet is accommodated until an arbitrary position.

13. A portable information instrument claimed in claim 12 further including a release means for releasing the inhibition of said retraction of said cover sheet by said stopper mechanism, in response to a control instruction given when said stopper mechanism inhibits said retraction of said cover sheet by said retracting mechanism.

14. A portable information instrument claimed in claim 13 further including a counting means for counting the number of said rectangular hard pieces which have been accommodated into the inside of said housing, and a control means for controlling said stopper mechanism to inhibit said retraction of said cover sheet by said retracting mechanism, when a count value of said counting means reaches a predetermined value.

15. A portable information instrument claimed in claim 14 wherein said retracting mechanism includes a pulling spring for pulling said cover sheet into the inside of said housing, for accumulating a pulling-out force expended when said cover sheet was pulled out from the inside of said housing, and for retracting said cover sheet into the inside of said housing by action of the pulling-out force accumulated when said cover sheet was pulled out from the inside of said housing.

* * * * *